Oct. 3, 1944.  J. H. HOERN  2,359,477
METHOD OF MAKING HOLLOW HEAD VALVES
Filed July 3, 1942   2 Sheets-Sheet 1

INVENTOR.
BY JOSEPH H. HOERN.
John F. Stark
ATTORNEY.

Oct. 3, 1944.  J. H. HOERN  2,359,477
METHOD OF MAKING HOLLOW HEAD VALVES
Filed July 3, 1942  2 Sheets-Sheet 2

INVENTOR.
JOSEPH H. HOERN
BY John F. Stark
ATTORNEY.

Patented Oct. 3, 1944

2,359,477

UNITED STATES PATENT OFFICE 2,359,477

METHOD OF MAKING HOLLOW HEAD VALVES

Joseph H. Hoern, Birmingham, Mich., assignor to Eaton Manufacturing Company, Cleveland, Ohio, a corporation of Ohio Application July 3, 1942, Serial No. 449,587

2 Claims. (Cl. 29—156.7)

This invention relates to a method of making articles and particularly to methods of manufacturing headed articles having hollow cavities therein from two different metals; such as, hollow poppet valves for internal combustion engines having a facing and seating portion of dissimilar metal and a coolant material such as metallic sodium within the hollow portion thereof. According to this invention articles, such as, hollow poppet valves are made by forming a cylindrical metal blank of a diameter smaller than the diameter of valve head and larger than the diameter of the valve stem and welding thereon a cylindrical piece of dissimilar material of approximately the same diameter as said blank, removing the flash caused by welding, upsetting the blank by a forging operation into a thin disc-like shape, forming said disc into a recessed cup-shaped blank having an open and a closed end, and expanding the closed end of said blank into a cavity approximately the size and shape of the valve head.

It is an object of this invention to provide a method of forming hollow poppet valves having the top of the head and seating portion thereof faced with dissimilar metal.

It is a further object of this invention to provide a method of making a composite hollow valve having a uniform wall thickness formed from two pieces of dissimilar metal formed into a disc which is drawn into a cup-shaped composite metal blank. A deformable or flowable material, such as, lead, copper, salt, graphite, or oil is placed into the cup-shaped blank before inserting the blank in the two-piece mould, which is formed with a bore approximately the size of the external diameter of the blank, the bore in the mould terminating in an enlarged annular recess extending outwardly and downwardly to a curved end wall, forming a cavity slightly larger than the shape of the valve head.

The wall of the cup-shaped blank is expanded into the mould cavity by pressure applied to the deformable material by a plunger which fits into the bore of the blank and has an annular shoulder provided for thrusting against the top of the blank to seal the flowable material therein. The plunger moving towards and into the blank causes the blank to shorten and the metal of the blank to flow laterally against the walls of the mould cavity and into the enlarged portion thereof. The deformable material is then removed from the blank which is then forged or swaged into the desired shape of the valve.

Other and further objects of the invention will become apparent to those skilled in the art from the following detailed description of the annexed sheets of drawings which disclose preferred embodiments of this invention.

Figure 1:
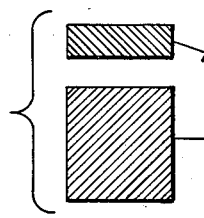
Fig. 1 is a vertical cross-sectional view of the cylindrical blank before welding.
Figure 2:
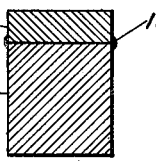
Fig. 2 is a vertical cross-sectional view of the blank after welding.
Figure 3:
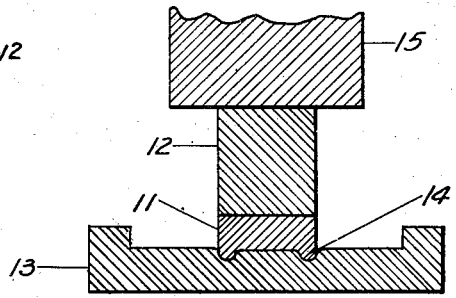
Fig. 3 is a sectional view of a mould and forging plunger receiving the blank prior to the forging operation.

In the drawings, particularly, Figs. 1 and 2, the reference numerals 10 and 11 designate a blank of two different materials; as an example, a preferred material for blank 10 may be the following alloy:

|  | Per cent |
|---|---|
| Carbon | .40 to .50 |
| Chromium | 13.00 to 15.00 |
| Nickel | 13.00 to 15.00 |
| Silicon | .30 to .80 |
| Manganese | .70 maximum |
| Tungsten | 1.75 to 3.00 |
| Molybdenum | .20 to .50 |
| Phosphorus | .03 maximum |
| Sulphur | .03 maximum |
| Iron | Balance | and, as an example, a preferred alloy for blank 11 may be the following alloy and is sometimes referred to as "Brightray":

|  | Per cent |
|---|---|
| Carbon | .15 to .30 |
| Chromium | 19.00 to 21.00 |
| Manganese | .60 to 1.00 |
| Silicon | .30 maximum |
| Iron | 1.00 maximum |
| Sulphur | .03 maximum |
| Nickel | Balance |

Figure 4:
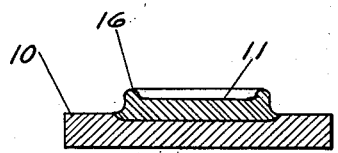
Fig. 4 is a cross-sectional view of the blank disc after a second forging operation.
Figure 5:
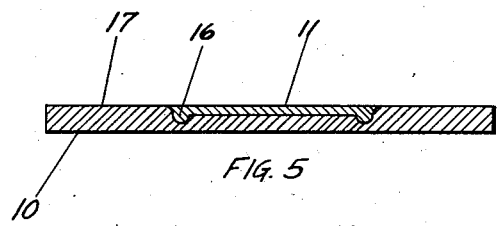
Fig. 5 is a cross-sectional view of the composite blank disc in a further flattened state after a third forging operation.

The blanks 10 and 11 are welded together by a well-known flash-welding method. After the welding operation, the flash 12, is removed by cylindrical grinding and the quality of the weld is inspected. The blank is then heated to a predetermined temperature suitable for forging and is placed in the mould 13, which is formed with a circular recess 14 of a diameter approximately that of the blank and of a sufficient depth to form a projection 16 on the dissimilar metal 11. The plunger 15 is forced against the blank shortening the blank into a round disc, shown in Fig. 4, which has the projection 16 formed thereon by the recess 14 in mould 13. The disc-shaped blank is then again heated and forged in a flat mould, not shown, which spreads the projection 16 and enlarges the diameter and reduces the thickness of the composite metal disc-shaped member into a blank 17, as shown in Fig. 5.

Figure 6:
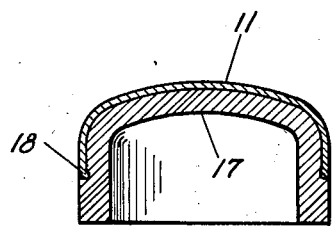
Fig. 6 is a cross-sectional view of the blank after being drawn by the first drawing operation into a partially formed cup-shaped blank.
Figure 7:
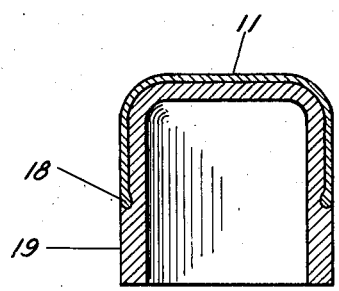
Fig. 7 is a cross-sectional view of the composite cup-shaped blank after the second drawing operation, which further displaces the dissimilar metal around the blind end of this cup-shaped blank.

The composite metal disc 17 is then placed in a well-known type of drawing die, including a plunger, not shown, and is drawn into a partially formed composite metal blank 18, as shown in Fig. 6, the dissimilar metal 11 from the disc-shaped blank being spread over the outer face and for a short distance over the outer diameter of the cup-shaped blank near the blind end 17 thereof. The composite metal cup-shaped blank 18 is then drawn by a second drawing operation similar to the first drawing operation, the second drawing operation reducing the diameter and increasing the length of the cup-shaped blank, as shown in Fig. 7, and spreading the dissimilar metal 11 towards the open end of the cup-shaped blank to form the seating portion of the valve, as shown by numeral 19.

Figure 8:
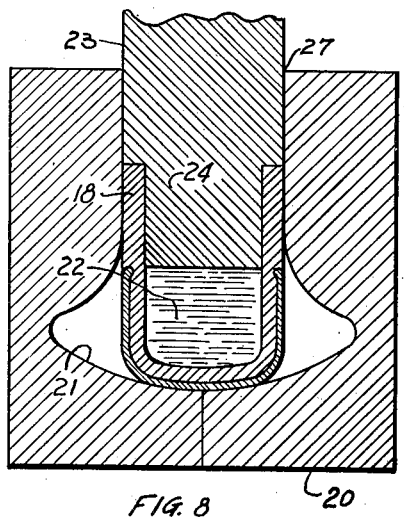
Fig. 8 is a two-piece split hollow cavity mould and a plunger with the cup-shaped composite blank within the mould.

The composite metal recessed cup-shaped piece 18 is then heated and placed in a two-piece split mould 20, shown in Fig. 8. A deformable or flowable material 22, such as, molten copper, lead, graphite, salt, or oil, or any other material that will not injure the metal of the cup-shaped blank 18 is introduced into a recess 21 of the cup-shaped blank. The plunger 23, having a reduced end portion 24, fits into the open end of the cup-shaped composite metal blank 18, the enlarged portion of which fits into the bore 27 of the die 26. Pressure is applied to the plunger 23, which forces the cup-shaped blank towards the blind end of the mould cavity 21, which causes the cup-shaped blank 18 to shorten and creates pressure on the deformable material 22 which exerts an expanding force against the side and end walls of the blank and causes the flowable material 22 to uniformly expand the cup-shaped composite metal blank into the cavity 21 resulting in an enlarged valve head shaped to the contour of the cavity 21, the outer face and seating portion of which is covered with the dissimilar material 11, as shown in Fig. 8. The plunger 23 is then withdrawn and the deformable or flowable material removed.

Figure 9:
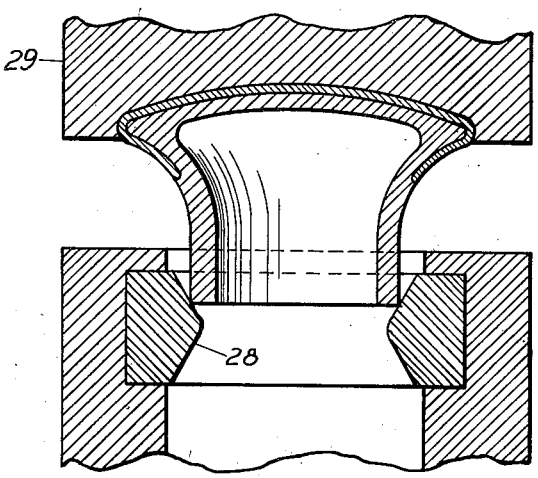
Fig. 9 is a cross-sectional view of the first extruding die and plunger which may be used for reducing the opened end portion of the blank to the rough valve diameter.
Figure 10:
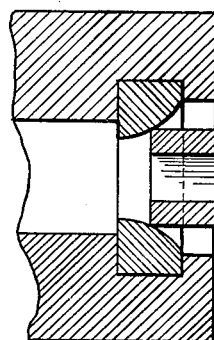
Fig. 10 is a sectional view of the second extruding die and plunger.
Figure 10:
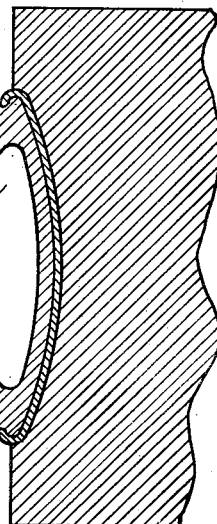

The hollow stem portion 19 is then worked down by an extruding operation shown in Figs. 9 and 10. The enlarged headed-recess blank is placed between extruding die 28 and the plunger 29. Pressure is applied to plunger 29, forcing the blank into die 28, which reduces and lengthens the blank into the valve stem 31. It may be desirable on the larger sizes of valves to perform several such extruding operations to reduce the blank to a diameter suitable for the final turning and grinding operations. It is understood, however, that I may use other forging or swaging methods to work the blank down to the rough size of the valve stem.

Figure 11:
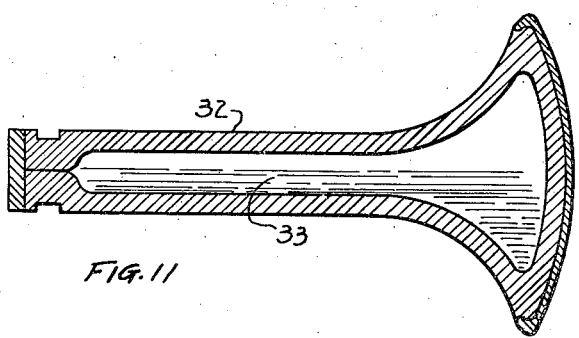
Fig. 11 is a cross-sectional view of the finished valve.

The reference number 32 designates a completed composite metal valve having a hollow head, the outer face and seating portions of which are covered with dissimilar metal integrally united to the valve. The thickness of this facing and seating material may be controlled to any desired amount by the length of the piece of metal 11 which is welded on blank 10, as shown in Fig. 1, and selection of the proper diameter and depth of recess 14 in the mould 13. By controlling the thickness of the metal designated by number 19 in Fig. 7, the valve seating surface may be of any desired thickness. In most valves, the facing material over the valve head does not need to be of the same thickness of the seating material. The numeral 33 in Fig. 11 designates the coolant material within the hollow cavity of the valve. This coolant material is generally salt or metallic sodium and only partially fills the cavity within the valve.

From the foregoing disclosures it will now be apparent there has been described a novel and distinctive method of manufacturing hollow headed articles, including poppet valves, embodying, among other things, the objects and advantages of the invention first enumerated. It is not intended to be limited however, to the precise order of the steps enumerated, as formal modifications will now be suggested to those skilled in the art to which it is related, for example, the molten deformable material may be placed in the cup shaped blank either before or after the blank is confined in the mould cavity, preparatory to being operated thereupon. Accordingly, the spirit and substance of the invention is considered commensurate with scope of the following claims.

What I claim is:

1. A method of making a hollow head poppet valve which comprises: providing a cylindrical blank of sufficient length and diameter to form the valve head and stem; integrally uniting thereto a cylindrical blank of dissimilar metal of sufficient length and diameter to subsequently form therefrom the outer face and seating portion of the valve head; heating and forging said blank into a disc, thereby causing said dissimilar metal to be located in the center thereof and having a thickness less than said disc and a diameter sufficient to form said aforementioned outer face and seat; drawing said composite disc into a cup-shaped metal blank having said dissimilar metal located on the outer side of the closed end of said cup and extending along the periphery of the cylindrical portion, a distance short of the end thereof; bottoming said heated cup-shaped blank in the cavity of a mould with its open end extending outwardly thereof, said cavity having an enlarged portion at the bottom thereof; partially filling said cup-shaped blank with a deformable material; displacing the closed end of said cup-shaped blank outwardly and against the walls of said enlarged portion of said cavity by the application of pressure exerted against the open end of said cup-shaped member and said deformable material, said dissimilar metal thereby forming the outer head and seat portion of said valve; removing said deformable material from said cup-shaped member and thereafter shaping said cup-shaped member into a hollow headed poppet valve of predetermined size.

2. A method of making a hollow head poppet valve which comprises: providing a blank of sufficient length and diameter to form the valve head and stem; integrally uniting thereto a blank of dissimilar metal of sufficient length and diameter to form the outer face and seating portion of the valve head; heating and forging said composite blank into a disc, thereby causing said dissimilar metal to be located over a portion of the central area of said disc sufficient to form therefrom the outer face and seat portion of the valve head, forging said blank into a cylindrical cup-shaped member thereby causing said dissimilar metal to form the outer side of the closed end of said blank and to extend partially along the cylindrical portion thereof; enlarging the closed end of said cup-shaped member by placing the same in a mould having a cavity with an enlarged portion at the bottom thereof, partially filling said cup-shaped member with a displaceable material and then applying pressure against the open end of said cup-shaped member and said displaceable material, said dissimilar metal thereby assuming the shape of the enlarged portion of said cavity in said mould and forming the outer head and seat portion of said valve; and then shaping said blank to a predetermined size.

JOSEPH H. HOERN.